(12) United States Patent
Weiss et al.

(10) Patent No.: US 11,500,189 B2
(45) Date of Patent: Nov. 15, 2022

(54) LIGHT SHEET MICROSCOPE AND METHOD FOR DETERMINING THE REFRACTIVE INDICES OF OBJECTS IN THE SPECIMEN SPACE

(71) Applicant: Leica Microsystems CMS GmbH, Wetzlar (DE)

(72) Inventors: Alexander Weiss, Linden (DE); Christian Schumann, Lich (DE); Ronja Capellmann, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 0 days.

(21) Appl. No.: 17/599,646

(22) PCT Filed: Mar. 25, 2020

(86) PCT No.: PCT/EP2020/058256
§ 371 (c)(1),
(2) Date: Sep. 29, 2021

(87) PCT Pub. No.: WO2020/207795
PCT Pub. Date: Oct. 15, 2020

(65) Prior Publication Data
US 2022/0206281 A1   Jun. 30, 2022

(30) Foreign Application Priority Data
Apr. 12, 2019  (DE) .................... 10 2019 109 832.7

(51) Int. Cl.
*G02B 21/00* (2006.01)
*G02B 21/33* (2006.01)
(Continued)

(52) U.S. Cl.
CPC ............. *G02B 21/33* (2013.01); *G01N 21/55* (2013.01); *G02B 21/008* (2013.01);
(Continued)

(58) Field of Classification Search
CPC .... G02B 21/008; G02B 21/002; G02B 21/02; G02B 21/082; G02B 21/26; G02B 21/33;
(Continued)

(56) References Cited

U.S. PATENT DOCUMENTS

| 8,582,203 B2 | 11/2013 | Dunsby |
| 2003/0025899 A1* | 2/2003 | Amara .................... G01N 21/41 356/73 |

(Continued)

FOREIGN PATENT DOCUMENTS

| DE | 10 2007 043 937 A1 | 3/2008 |
| DE | 10 2010 030 430 A1 | 12/2011 |

(Continued)

*Primary Examiner* — Mustak Choudhury
(74) *Attorney, Agent, or Firm* — Leydig, Voit & Mayer, Ltd.

(57) ABSTRACT

A light sheet microscope includes a sample chamber in which a cover slip or slide is arrangeable, which has a surface that defines a partially reflective interface and which has a further surface that defines a further partially reflective interface. The two interfaces are arranged at different distances from an objective. The light sheet microscope further includes an optical system having the objective facing toward the cover slip or slide, an illumination apparatus, which is designed to generate a light sheet, a sensor, and a processor. The two interfaces are formed in that two optical media are applicable in the sample chamber. The light sheet microscope forms a measuring device for acquiring a measured variable. The sensor is designed to acquire the intensities and/or the incidence locations of the two reflection light beams.

15 Claims, 8 Drawing Sheets

(51) Int. Cl.
*G01N 21/55* (2014.01)
*G02B 21/02* (2006.01)
*G02B 21/08* (2006.01)
*G02B 21/34* (2006.01)

(52) U.S. Cl.
CPC ......... *G02B 21/0032* (2013.01); *G02B 21/02* (2013.01); *G02B 21/082* (2013.01); *G02B 21/34* (2013.01)

(58) Field of Classification Search
CPC .... G02B 21/34; G02B 11/06; G02B 11/0625; G01N 21/41; G01N 21/55
See application file for complete search history.

(56) References Cited

U.S. PATENT DOCUMENTS

| | | |
|---|---|---|
| 2007/0236687 A1 | 10/2007 | Mikuriya et al. |
| 2011/0317260 A1 | 12/2011 | Krueger |
| 2012/0097835 A1* | 4/2012 | Sharonov ............. G02B 21/245 250/201.3 |
| 2013/0094016 A1 | 4/2013 | Knebel et al. |
| 2015/0330776 A1* | 11/2015 | Hayashi ................. G02B 21/34 356/138 |
| 2016/0048967 A1* | 2/2016 | Mitzkus ................... G01B 9/04 382/103 |
| 2016/0187633 A1* | 6/2016 | Rondeau ................ G02B 21/18 359/385 |
| 2016/0349495 A1* | 12/2016 | Pretorius ............ G02B 27/0025 |
| 2018/0321480 A1* | 11/2018 | Ohrt ......................... G01N 1/30 |
| 2019/0101740 A1* | 4/2019 | Kalkbrenner ......... G06T 7/0014 |
| 2019/0170995 A1* | 6/2019 | Siebenmorgen ....... G02B 21/02 |
| 2019/0243118 A1 | 8/2019 | Schumann |
| 2019/0339505 A1 | 11/2019 | Siebenmorgen et al. |

FOREIGN PATENT DOCUMENTS

| | | |
|---|---|---|
| DE | 10 2011 084 562 A1 | 4/2013 |
| DE | 10 2016 119 268 B3 | 12/2017 |
| DE | 10 2016 212 019 A1 | 1/2018 |
| EP | 3 036 577 B1 | 12/2017 |
| WO | WO 2015/109323 A2 | 7/2015 |
| WO | WO 2017/210159 A1 | 12/2017 |

* cited by examiner

LIGHT SHEET MICROSCOPE AND METHOD FOR DETERMINING THE REFRACTIVE INDICES OF OBJECTS IN THE SPECIMEN SPACE

CROSS-REFERENCE TO PRIOR APPLICATIONS

This application is a U.S. National Phase application under 35 U.S.C. § 371 of International Application No. PCT/EP2020/058256, filed on Mar. 25, 2020, and claims benefit to German Patent Application No. DE 10 2019 109 832.7, filed on Apr. 12, 2019. The International Application was published in German on Oct. 15, 2020 as WO 2020/207795 under PCT Article 21(2).

FIELD

The invention relates to a light sheet microscope. Furthermore, the invention relates to a method for acquiring a measured variable by means of a light sheet microscope.

BACKGROUND

In a light sheet microscope, the imaging of a sample is influenced by a cover slip or slide, if one is arranged between the sample and the imaging objective in a sample chamber of the light sheet microscope. The imaging of the sample is furthermore influenced by two optical media which border the cover slip or slide from opposite sides. These optical media are formed, for example, by an immersion medium, which borders both the cover slip and also the objective, and an embedding medium, which surrounds the sample and which borders the surface of the cover slip facing away from the objective.

In particular, with regard to active correction of imaging errors, on the one hand, it is desirable to know the thickness of the cover slip, since this determines the length of the optical path which the detection light to be acquired by the objective passes through during the passage through the cover slip. On the other hand, it is desirable to know the indices of refraction of the different optical media, which border one another in a sample chamber of the microscope. Due to their different indices of refraction, these optical media form interfaces at which the index of refraction suddenly changes. Each of these interfaces has a different effect on the optical imaging depending on how large the jump of the index of refraction is there.

The distance between the cover slip or slide and the imaging objective represents a further optical parameter. It is necessary to know this distance, for example, to implement an autofocus system.

Document US 8 5082 203 B2 discloses a light sheet microscope having an illumination unit for generating a light sheet and an objective. The light sheet is arranged in a sample in such a way that the propagation direction of the illumination light forming the light sheet is not perpendicular to the optical axis of the objective of the microscope. Such light sheet microscopes are therefore also referred to as oblique plane microscopes (OPM).

Document DE 10 2016 119 268 B3 discloses a light sheet microscope having an illumination unit which generates a light sheet in an intermediate image space, and a transport optical unit, which images the light sheet in the sample.

Documents WO 2017/210159 A1 and WO 2015/109323 A2 each disclose a light sheet microscope having an illumination unit which is designed to generate a light sheet and move it laterally through a sample. Such light sheet microscopes are also referred to as SCAPE microscopes (SCAPE: swept confocally-aligned planar excitation).

Document DE 10 2010 030 430 A1 discloses a triangulating autofocus unit for a microscope. This autofocus unit generates a slit image, which is imaged on a position-sensitive detector, on the sample by means of a measurement light beam made up of near infrared light. The autofocus is controlled via the incidence position acquired by the detector.

It is thus desirable in the field of light sheet microscopy to acquire a measured variable in a particularly simple manner, which permits the determination of an optical parameter of the above-explained type.

SUMMARY

In an embodiment, the present invention provides a light sheet microscope. The light sheet microscope comprises a sample chamber in which a cover slip or slide is arrangeable, which has a surface that defines a partially reflective interface and which has a further surface that defines a further partially reflective interface, wherein the two interfaces are arranged at different distances from an objective, an optical system having the objective facing toward the cover slip or slide, an illumination apparatus, which is configured to generate a light sheet, a sensor, and a processor. The two interfaces are formed in that two optical media are applicable in the sample chamber, which border the two surfaces of the cover slip or slide. The light sheet microscope forms a measuring device for acquiring a measured variable which is configured to guide the light sheet by way of the optical system with oblique incidence on the cover slip or slide, to generate a reflection light beam in that the light sheet is partially reflected at the partially reflective interface, to generate a further reflection light beam in that the light sheet is partially reflected at the further partially reflective interface and to receive the two reflection light beams by way of the optical system and to guide them onto the sensor. The sensor is configured to acquire the intensities and/or the incidence locations of the two reflection light beams. The processor is configured to ascertain the measured variable on the basis of the acquired intensities and/or the incidence locations of the two reflection light beams. The processor is configured to determine, on the basis of the acquired intensities of the two reflection light beams, the index of refraction of one of the two optical media as a measured variable.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a light sheet microscope and a method which enable simple and precise determination of such a measured variable.

The light sheet microscope comprises a sample chamber, in which a cover slip or slide is arrangeable, which has a surface that defines a partially reflective interface, an optical system having an objective facing toward the cover slip or slide, an illumination unit, which is designed to generate a light sheet, a sensor and a processor. The two interfaces are formed in that two optical media are applicable in the sample chamber, which border the two surfaces of the cover slip or slide. The light sheet microscope is embodied so that it forms a measuring device for acquiring a measured variable. In particular, the measuring device is designed to guide the light sheet through the optical system with oblique incidence on the cover slip or slide, to generate a reflection light beam in that the light sheet is partially reflected at the interface, and to receive the reflection light beam by way of the optical system and guide it onto the sensor. The sensor is designed to acquire the intensity and/or the incidence location of the reflection light beam. The processor is designed to ascertain the measured variable on the basis of the acquired intensity and/or the incidence location of the reflection light beam.

A cover slip or slide is understood in this application in particular as a cover slip covering a sample, a microscope slide, a bottom of a petri dish or a bottom of a cavity of a microtitration plate. The surface of the cover slip or slide which forms the interface can be both a surface facing toward the objective or a surface of the cover slip or slide facing away from the objective. The sensor is preferably designed as a position-sensitive sensor, i.e., as a sensor which is suitable for acquiring the intensity and the incidence location.

The light sheet microscope uses the reflection light beam, i.e., a partial reflection of the light sheet on the surface of the cover slip or slide, to acquire the measured variable. The reflection light beam used to ascertain the measured variable thus has a wavelength which generally differs by a few nanometers, the so-called Stokes shift, from the wavelength of detection light which originates from the sample. The Stokes shift is approximately 5 to 20 nm, in the case of unusual fluorophores also more. This means in particular that when ascertaining a wavelength-dependent measured variable, no conversion of the measured variable to the wavelength of the detection light is necessary and no assumption has to be made about the dispersion. A particularly reliable ascertainment of the measured variable becomes possible in this way.

In particular, those measured variables which are required for determining an imaging error are wavelength-dependent, for example, the length of an optical path through the cover slip or slide or an index of refraction. The proposed light sheet microscope can thus be used to improve the imaging quality of the light sheet microscope in that matching positioning variables of the light sheet microscope are set on the basis of the ascertained measured value.

The partial reflection of the light sheet also occurs in previously known light sheet microscopes. In this case, it represents an interfering variable which is separated from the detection light by means of a blocking filter. The proposed light sheet microscope thus particularly advantageously uses an interfering variable, which is disadvantageous as such to improve the imaging quality. The solution described here is therefore implementable with little expenditure in that an already existing light sheet microscope is configured accordingly.

Since the cross section of the light sheet perpendicular to its propagation direction is essentially linear, the reflection of the light sheet on the cover slip or slide also appears linearly. In the present light sheet microscope, the light sheet thus fulfills the same function as a measurement light beam formed by means of a slit aperture in known autofocus units, for example according to DE 10 2010 030 430 A1.

In one preferred embodiment, the processor is designed to ascertain the distance of the cover slip or slide from the objective along its optical axis as the measured variable on the basis of the acquired incidence location of the reflection light beam. In this embodiment, the measuring device can be used as an autofocus device or as part of such a device.

In particular, a tilt of the cover slip or slide can also be determined as a measured variable by means of this embodiment. For this purpose, at least three measurement points which span a plane are defined on the surface of the cover slip or slide. For each of the three measurement points, the distance of the respective measurement point from the objective along its optical axis is ascertained. Subsequently, a tilt of the plane spanned by the three measurement points relative to the optical axis of the objective is determined as the tilt of the surface of the cover slip on the basis of the ascertained distances.

It is assumed here that the plane spanned by the at least three measurement points is coplanar to the mentioned surface of the cover slip or slide. The tilt of this plane relative to the optical axis of the objective therefore reflects the tilt of the cover slip or slide. Each of the at least three measurement points is defined in each case by three coordinates of which one specifies the distance of the measurement point to be determined from the objective along its optical axis, while the two other coordinates define the location of the respective measurement point on the surface of the cover slip.

In a further preferred embodiment, the cover slip or slide has a further surface which defines a further partially reflective interface. The two interfaces are arranged here at different distances from the objective. Furthermore, the measuring device is designed in this embodiment to generate a further reflection light beam in that the light sheet is partially reflected on the further interface, and to receive the further reflection light beam by way of the objective and to guide it onto the sensor. The sensor is designed to acquire the intensity and/or the incidence location of the further reflection light beam. The processor is designed to ascertain the measured variable on the basis of the acquired intensities and/or incidence locations of the two reflection light beams.

In this way, measured variables can be ascertained, the ascertainment of which would not be possible solely on the basis of the acquired intensity and/or the incidence location of a single reflection light beam. Such measured variables are in particular the thickness of the cover slip or slide and the indices of refraction of optical media bordering the cover slip or slide. This increases the flexibility of the light sheet microscope.

In one preferred embodiment, the processor is designed to determine the thickness of the cover slip or slide as a measured variable on the basis of the acquired incidence locations of the two reflection light beams. In this case, the ascertained thickness of the cover slip or slide is given by the distance of the two partially reflective interfaces along the optical axis of the objective. To determine this distance, the two partial reflections are used which the light sheet guided onto the cover slip or slide experiences by the measuring device at the two interfaces, which are formed by the surfaces of the cover slip or slide opposing one another and optical media adjoining thereon. Since the index of refraction of the cover slip or slide differs from the indices of refraction of the two adjoining optical media, a jump in the index of refraction occurs at each of the two interfaces, which results in the partial reflections. Since the two interfaces are spaced apart from one another and the light sheet is incident obliquely on the interfaces with respect to the optical axis of the objective, a spatial separation of the two reflection light beams resulting at the interfaces takes place. This spatial separation is reflected in the incidence locations at which the two reflection light beams are incident on the detector. The acquired incidence locations of the reflection light beams thus uniquely correlate with the distance, which the two partially reflective interfaces have along the optical axis of the objective, which is used for the thickness measurement.

It is to be noted here that in this preferred embodiment, the one of the two reflection light beams which arises at the interface facing away from the objective first passes through the cover slip or slide itself and is refracted at the interface facing toward the objective, which it then passes through, before it enters the objective. A focus shift results therefrom, which means that the optical thickness of the cover slip or slide is determined as a measured variable.

In one special embodiment, the measuring device is designed to guide the two reflection light beams simultaneously onto the detector and to ascertain the thickness of the cover slip or slide on the basis of the mutual distance of the different incidence locations of the two reflection light beams. This special embodiment is designed in particular for cover slips or slides which are relatively thin with respect to the objective enlargement. This is because in this case the spatial separation of the two reflection light beams is correspondingly low, so that both may be acquired simultaneously on the detector.

In an alternative embodiment, the measuring device is designed to guide the two reflection light beams in succession onto the detector. This means that the measuring device only acquires one of the reflection light beams on the detector in each case at a given point in time. Such an embodiment is designed in particular for cover slips or slides which are comparatively thick with respect to the objective enlargement. In this case, the mutual distance of the two interfaces at which the reflection light beams arise is sufficiently large that the spatial separation of the reflection light beams accompanying this makes it impossible to receive both reflection light beams simultaneously on the detector.

If the measuring device guides the two reflection light beams in succession onto the detector, it is thus advantageous if the measuring device is designed to acquire the incidence location of the reflection light beam guided first onto the detector, subsequently to set an operating parameter of the light sheet microscope so that the incidence location of the reflection light beam subsequently guided onto the detector corresponds to the previously acquired incidence location, and then to ascertain the thickness of the cover slip or slide on the basis of the operating parameter.

In the above-mentioned embodiment, the processor is preferably designed to set the distance between the cover slip or slide and the objective as an operating parameter. This distance measured along the optical axis of the objective can be changed, for example, via a suitable adjustment device, such as a so-called z drive. In this case, two setting values of the z drive result, from the difference of which the optical thickness of the cover slip or slide may be ascertained.

Alternatively, the measuring device is designed to set the position of a displaceable focusing lens provided in the light sheet microscope as an operating parameter. The optical thickness of the cover slip or slide can then be ascertained as the measured variable from the position change of this displaceable focusing lens in consideration of the optical imaging relationships.

In a further embodiment, the processor is designed to ascertain as the measured variable, on the basis of the optical thickness, a mechanical thickness of the cover slip or slide in consideration of the indices of refraction of the cover slip or slide and an optical medium which adjoins both the objective and the cover slip or slide. The above-mentioned optical medium is, for example, an immersion medium located between the cover slip or slide and the objective. If the indices of refraction of the cover slip or slide and of the immersion medium are known, the mechanical thickness of the cover slip or slide may thus be calculated on the basis of the previously ascertained optical thickness according to the following equation:

$$d_{mech.} = d_{opt.} \cdot \frac{n_g}{n_{im}} \quad (1)$$

in which $d_{mech}$ denotes the mechanical thickness, $d_{opt}$ denotes the optical thickness, $n_g$ denotes the index of refraction of the cover slip or slide and $n_{im}$ denotes the index of refraction of the immersion medium.

If the mechanical thickness of the cover slip or slide is to be ascertained particularly precisely, the numeric aperture of the main beam of the light sheet in the sample chamber is thus additionally taken into consideration. This is preferably carried out according to the following equation:

$$d_{mech.} = d_{opt.} \cdot \sqrt{\frac{n_g^2 - NA^2}{n_{im}^2 - NA^2}} \quad (2)$$

in which NA denotes the numeric aperture of the main beam of the light sheet in the sample chamber.

The numeric aperture (NA) is given by the product of the index of refraction $n_{im}$ of the immersion medium and the angle of incidence at which the measurement light beam exiting from the objective is incident on the cover slip or slide in relation to the optical axis. Moreover, the typical imaging errors can be taken into consideration in the calculation of the mechanical thickness.

In one preferred embodiment, the two interfaces are formed in that two optical media in the sample chamber border the two surfaces of the cover slip or slide. Furthermore, the processor is designed to determine the index of refraction of one of the two optical media as a measured variable on the basis of the acquired intensities of the two reflection light beams.

The intensities of the two reflection light beams are dependent on the reflection and the transmission of the light sheet at the two interfaces which are defined by the cover slip or slide and the two optical media which border the cover slip or slide from opposite sides. The reflection and transmission processes, on which the intensities of the two reflection light beams spatially separated from one another are ultimately based, are thus essentially determined by the indices of refraction of the cover slip or slide and of the optical media bordering the cover slip or slide. If the index of refraction of the cover slip or slide and the index of refraction of one of the two optical media adjoining thereon are known, the index of refraction of the other medium may thus be reliably determined from the intensities acquired by the detector and the knowledge of the angle of incidence of the measurement light beam in the sample chamber.

The spatial separation of the two reflection light beams results here in that the measuring device guides the light sheet obliquely onto the cover slip or slide. Since the two partially reflective interfaces are axially offset to one another, i.e., spaced apart from one another along the optical axis of the objective, the oblique incidence of the light sheet on the two interfaces ensures that the two reflection light beams are reflected on different optical paths back into the objective. As a result, the two reflection light beams are thus acquired on the detector separately from one another at different incidence locations.

The processor is preferably designed to ascertain the index of refraction of the one optical medium on the basis of the ratio of the intensities of the two reflection light beams as a measured variable. The measurement of the index of refraction is thus quasi-self-referential. This means that the index of refraction can be determined independently of the intensity of the measurement light beam, i.e., no knowledge of this intensity is required.

The optical medium, the index of refraction of which is to be determined by means of the measuring device as a measured variable, is preferably an embedding medium for a sample which borders one of the two surfaces of the cover slip or slide. In this case, the other optical medium, the index of refraction of which is known from the outset, is preferably an immersion medium which borders the other surface of the cover slip or slide, on the one hand, and the objective, on the other hand. However, it is also possible to ascertain the index of refraction of any arbitrary medium by means of the measuring device if it directly borders one of the two surfaces of the cover slip or slide and thus forms a partially reflective interface.

In one preferred embodiment, the measuring device is designed to generate a measurement pattern by way of the light sheet on the interface and to image the measurement pattern by way of the reflection light beam on the sensor. Furthermore, the sensor is designed to acquire the measurement pattern in the form of a spatial intensity distribution, and the measuring device is designed to determine the intensity of the reflection light beam from the spatial intensity distribution.

The measurement pattern imaged on the detector is preferably acquired in the form of a spatial intensity distribution, from which the intensity of the reflection light beam is determined. If the measurement pattern imaged on the detector is given, for example, by the image of the cross section of the light sheet perpendicular to its propagation direction, the above-mentioned intensity distribution is thus obtained in that the respective image on the detector is integrated over a direction which is parallel to the longitudinal alignment of the cross section of the light sheet.

The sensor is preferably a planar detector or a line detector. A line detector permits the measuring device to be produced particularly cost-effectively. A planar detector increases the flexibility of the measuring device and, for example, can already be present as a detection unit of the light sheet microscope.

In one preferred embodiment, the light sheet microscope comprises a detection apparatus having a further sensor for acquiring the detection light originating from the sample and a beam splitter unit which is designed to guide the reflection light beam onto the sensor and the detection light onto the further sensor. The light sheet microscope comprises two sensors in this embodiment, which each have only one function. This permits the use of specialized sensors and thus more reliable acquisition of both the reflection light beam and also the detection light. The ascertainment of the measured variable becomes more reliable in this way.

In a further preferred embodiment, the light sheet microscope comprises a filter, which is switchable upstream of the sensor and which is opaque to the reflection light beam. This prevents the reflection light beam from influencing an acquisition of the detection light originating from the sample. Due to the switching ability of the filter, the sensor can be used to acquire both the reflection light beam and also the detection light.

The light sheet microscope preferably comprises a scanning element which is designed to move the light sheet along a scanning axis. The scanning element is, for example, a movable scanner mirror.

Alternatively or additionally, the light sheet microscope has an electronic focusing apparatus, which is designed to focus the light sheet on various planes in the sample chamber. The light sheet can also be moved along the scanning axis in this way.

If scanning takes place along the optical axis of the objective, the light sheet microscope is often also referred to as an OPM (OPM: oblique plane microscope). If the scanning takes place laterally to the optical axis of the objective, the light sheet microscope is often also referred to as a SCAPE microscope (SCAPE: swept confocally-aligned planar excitation). However, these designations are not always used unambiguously. Thus, so-called stage scanning microscopes (ssOPM) also exist, in which an object table moves the sample laterally to the optical axis.

The measuring device is preferably designed to guide the light sheet by way of the objective with oblique incidence onto the cover slip or slide, and/or to receive the reflection light beam by way of the objective and to guide it onto the sensor. In this embodiment, the objective forms a shared objective for illumination and detection. Alternatively, the optical system comprises a further objective and the measuring device is designed to guide the light sheet by way of this further objective with oblique incidence onto the cover slip or slide. In this alternative embodiment, the further objective forms a separate illumination objective.

The light sheet microscope preferably comprises a transport optical unit, which is designed to image the light sheet generated by the illumination apparatus in an intermediate image space in the sample.

The processor preferably comprises a memory in which parameters for ascertaining the measured variable are storable.

The two surfaces of the cover slip or slide are preferably formed plane-parallel to one another.

The invention furthermore relates to a method for acquiring a measured variable by means of a light sheet microscope. The method has the above-described advantages and can be refined in the same way, in particular by the features related to the light sheet microscope.

Figure 1:
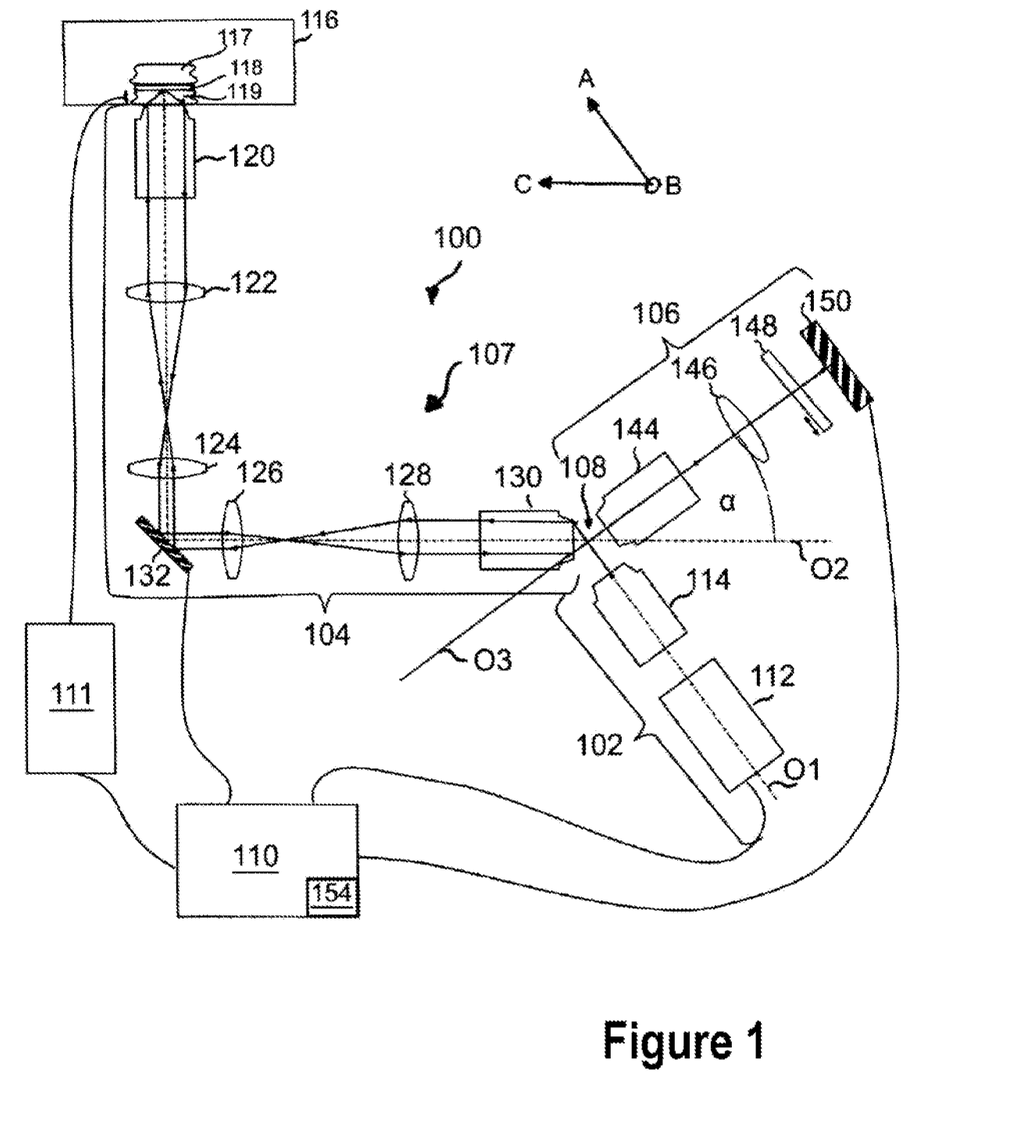
FIG. 1 shows a schematic illustration of a light sheet microscope, which provides scanning laterally to the optical axis of the objective, according to one embodiment.

FIG. 1 shows a schematic illustration of a light sheet microscope 100 in a special embodiment which provides scanning laterally to the optical axis O2 of an objective 120. As is apparent from the following description, the light sheet microscope 100 enables, in addition to light-sheet-microscopy imaging, the acquisition of a measured variable influencing the imaging. The light sheet microscope 100 thus also forms a measuring device for this measured variable.

The light sheet microscope 100 comprises an illumination apparatus 102, a transport optical unit 104, and a detection apparatus 106, which jointly form an optical system 107. The optical axis O3 of the detection apparatus 106 is tilted in relation to the optical axis O2 of the transport optical unit 104 by a tilt angle $\alpha$. The optical axis O1 of the illumination apparatus 102 is perpendicular to the optical axis O3 of the detection apparatus 106, so that the optical axis O1 of the illumination apparatus 102 is tilted in relation to the optical axis O2 of the transport optical unit 104 by an angle 90°-$\alpha$. The three above-mentioned optical axes O1, O2, O3 intersect in an intermediate image space 108. A cover slip or slide, referred to simply as a cover slip 118 hereinafter, and two optical media 117, 119, which each adjoin the cover slip 118, are arranged in a sample chamber 116 of the light sheet microscope 100. Furthermore, the light sheet microscope 100 has a processor 110.

The illumination apparatus 102 comprises a light source 112 and an illumination objective 114. The light source 112 generates a light sheet, for example with the aid of a cylinder lens, wherein the light sheet, with reference to an oblique-angled coordinate system shown in FIG. 1, extends in a light propagation direction A and an extension direction B perpendicular thereto. Alternatively, the light source 112 can also generate a quasistatic light sheet by means of a scanning element separately provided for this purpose. The illumination objective 114 images the light sheet in the intermediate image space 108. Alternatively, the light sheet can also be coupled directly into the transport optical unit 104.

The transport optical unit 104 comprises, seen from the sample chamber 116, the objective 120 facing toward the cover slip 118, a first tube lens 122, a first ocular 124, a second ocular 126, a second tube lens 128, and a projection objective 130, which are arranged along the optical axis O2 of the transport optical unit 104. A scanning device is arranged between the first ocular 124 and the second ocular 126, which scanning device is formed in the embodiment shown by a scanning mirror 132, at which the optical axis O2 of the transport optical unit 104 is deflected. With the aid of the movable scanning mirror 132, the light sheet can be moved along a scanning direction C which is perpendicular to the optical axis O2 of the transport optical unit 104.

The transport optical unit 104 images the light sheet from the intermediate image space 108 in the sample chamber 116. The light sheet extends with a parallel offset to the optical axis O2 of the transport optical unit 104. In this way, the light sheet 134 is guided into a subregion of an entry pupil 136 of the objective 120 which is laterally offset in relation to optical axis O2 of the transport optical unit 104 and thus in relation to the center of the entry pupil 136 (cf. FIGS. 5 and 7). The entry pupil 136 of the objective 120 is thus lit from underneath in a decentralized manner, which has the result that the light sheet is guided at an angle $\beta$ inclined to the optical axis O2 into the sample chamber 116. The transport optical unit 104 images the intermediate image space 108 conformally in the sample chamber 116. This means in particular that $\beta=90°-\alpha$ applies.

Figure 5:
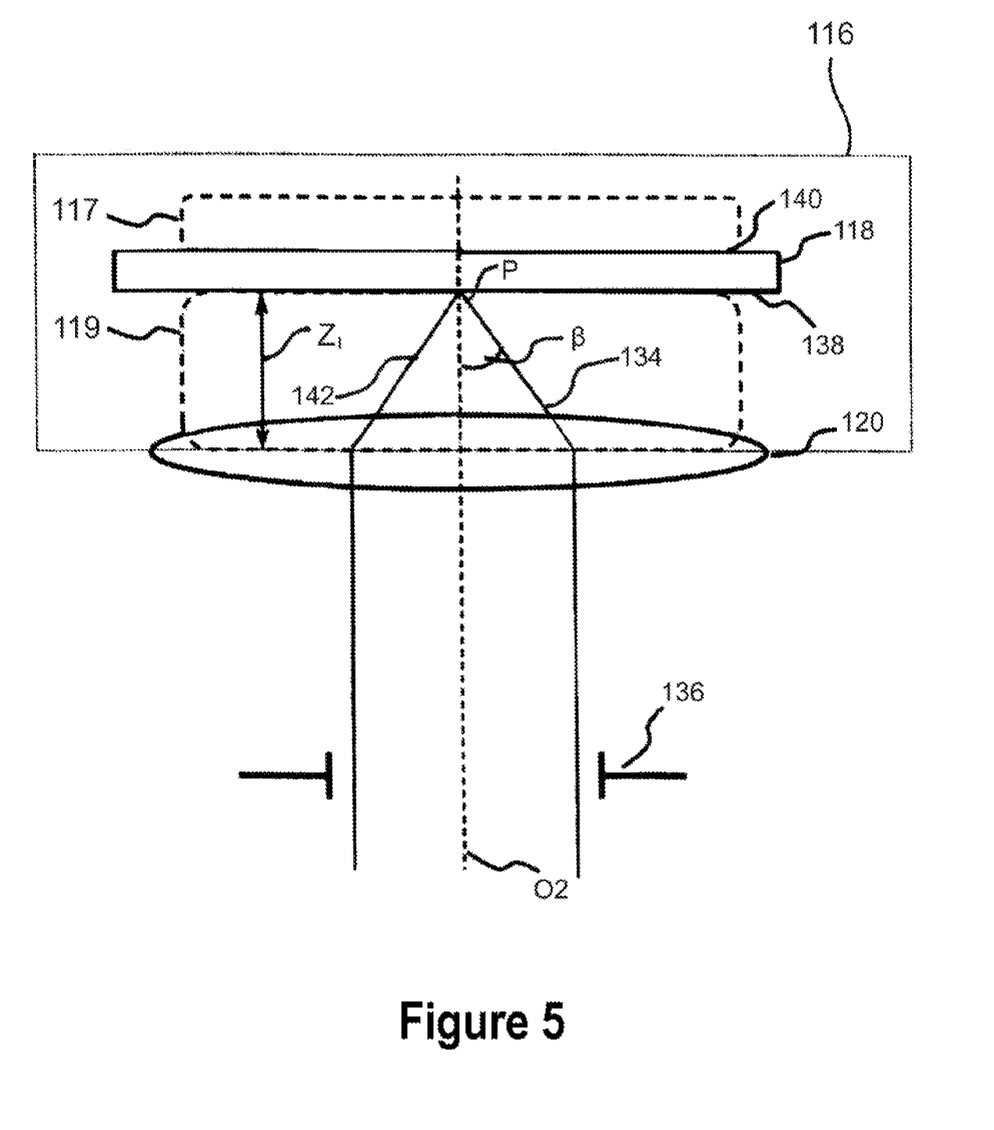
FIG. 5 shows a schematic illustration which shows a sample chamber of the light sheet microscope.
Figure 7:
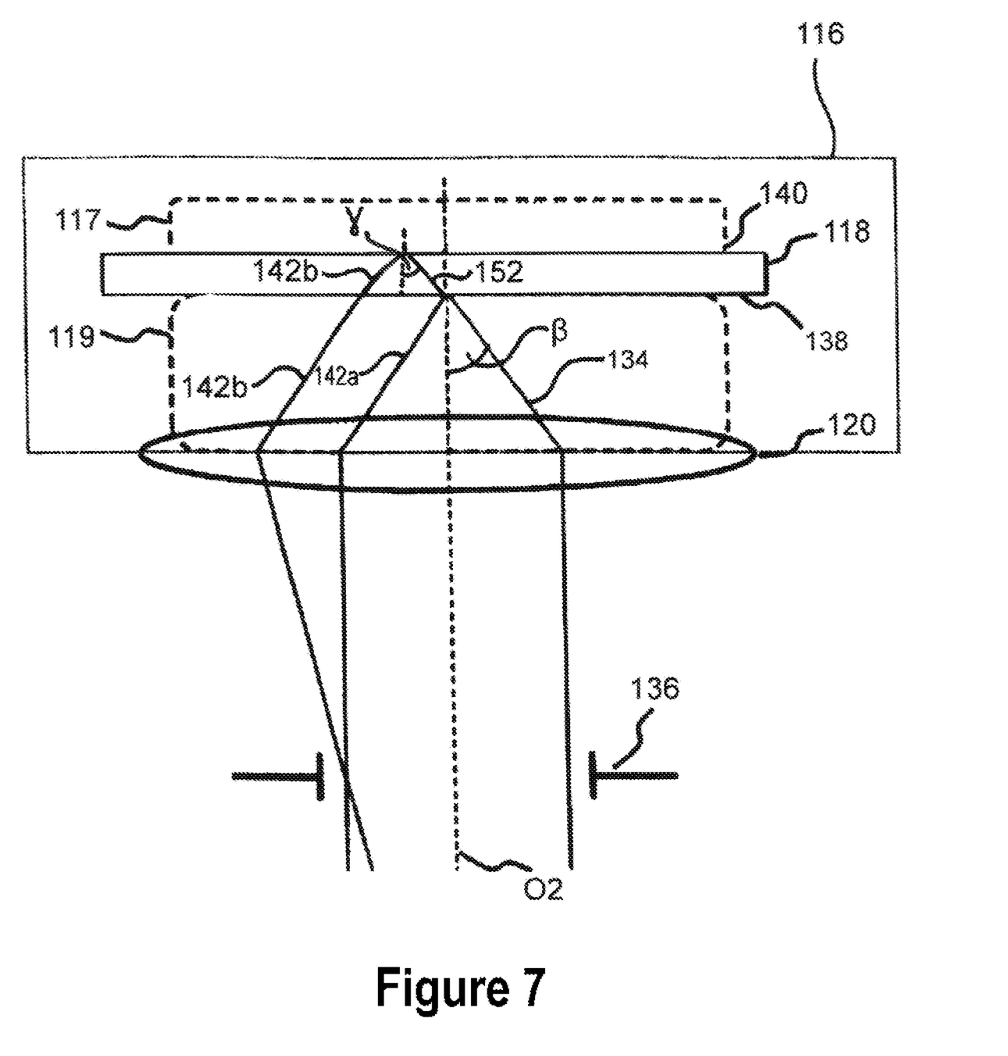
FIG. 7 shows a further schematic illustration which shows the sample chamber of the light sheet microscope.

The light sheet guided with oblique incidence into the sample chamber 116, as explained in more detail below with reference to FIGS. 5 and 7, is reflected on one or two surfaces 138, 140 of the cover slip 118, whereby a reflection light beam 142 guided back into the objective 120 results. The reflection light beam 142 is imaged by the transport optical unit 104 from the sample chamber 116 in the intermediate image space 108.

The detection apparatus 106 comprises, seen from the intermediate image space 108, a detection objective 144, a tube lens 146, a filter 148 switchable upstream, and a preferably position-sensitive sensor 150. The intermediate image, situated in the intermediate image space 108, of the reflection light beam 142 is imaged by the detection objective 144 and the tube lens 146 on the position-sensitive sensor 150. The filter 148 switchable upstream can be introduced into the beam path of the detection apparatus 106 and thus switched in upstream of the position-sensitive sensor 150. In this way, it is possible to prevent the reflection light beam 142 from being incident on the position-sensitive sensor 150 when it is to be used for the acquisition of detection light which originates from a sample in the sample chamber 116. In this way, undesired interfering reflections generated by the reflection light beam 142 are avoided.

The processor 110 is connected to the light source 112, the scanning mirror 132, the position-sensitive sensor 150, and to a so-called z drive 111, which can change the position of the cover slip 118 along the optical axis O2 of the objective 20, for example by moving a microscope table. The processor 110 is designed to ascertain the measured variable on the basis of the acquired intensity and/or the incidence location of the reflection light beam 142. The processor 110 furthermore has a memory 154 in which parameters for ascertaining the measured variable are storable.

Figure 2:
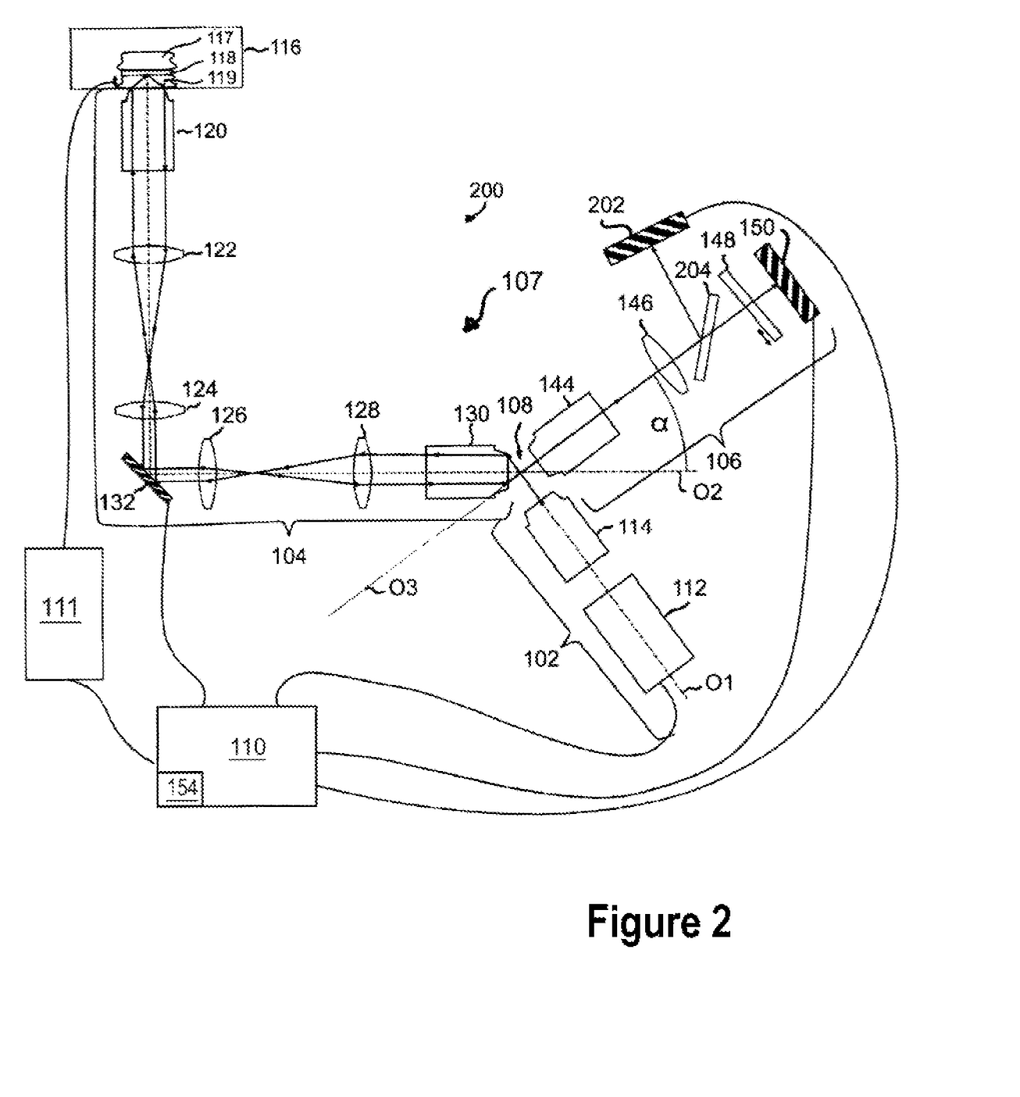
FIG. 2 shows a schematic illustration of the light sheet microscope, which provides scanning laterally to the optical axis of the objective, according to an embodiment having two sensors.

FIG. 2 shows a schematic illustration of a light sheet microscope 200, which provides scanning laterally to the optical axis O2 of the objective 120. The light sheet microscope 200 represents a modified embodiment having two sensors 150, 202. The light sheet microscope 200 according to FIG. 2 therefore differs from the embodiment according to FIG. 1 essentially due to the further sensor 202 and a beam splitter unit 204, which is designed to guide the reflection light beam 142 onto the position-sensitive sensor 150 and detection light onto the further sensor 202. Identical and identically acting elements are identified by the same reference signs in FIGS. 1 and 2.

In the embodiments shown in FIGS. 1 and 2, scanning is carried out by means of the light sheet in such a way that the light sheet is moved in scanning direction C transversely to the optical axis O2 of the objective 120. In contrast, a light sheet microscope 300 is shown as a modified embodiment in FIG. 3, which differs from the embodiment according to FIG. 1 essentially in that the scanning is carried out by the light sheet axially, i.e., along the optical axis O2 of the transport optical unit 104. Identical and identically acting elements are identified by the same reference signs in FIGS. 1 to 3.

Figure 3:
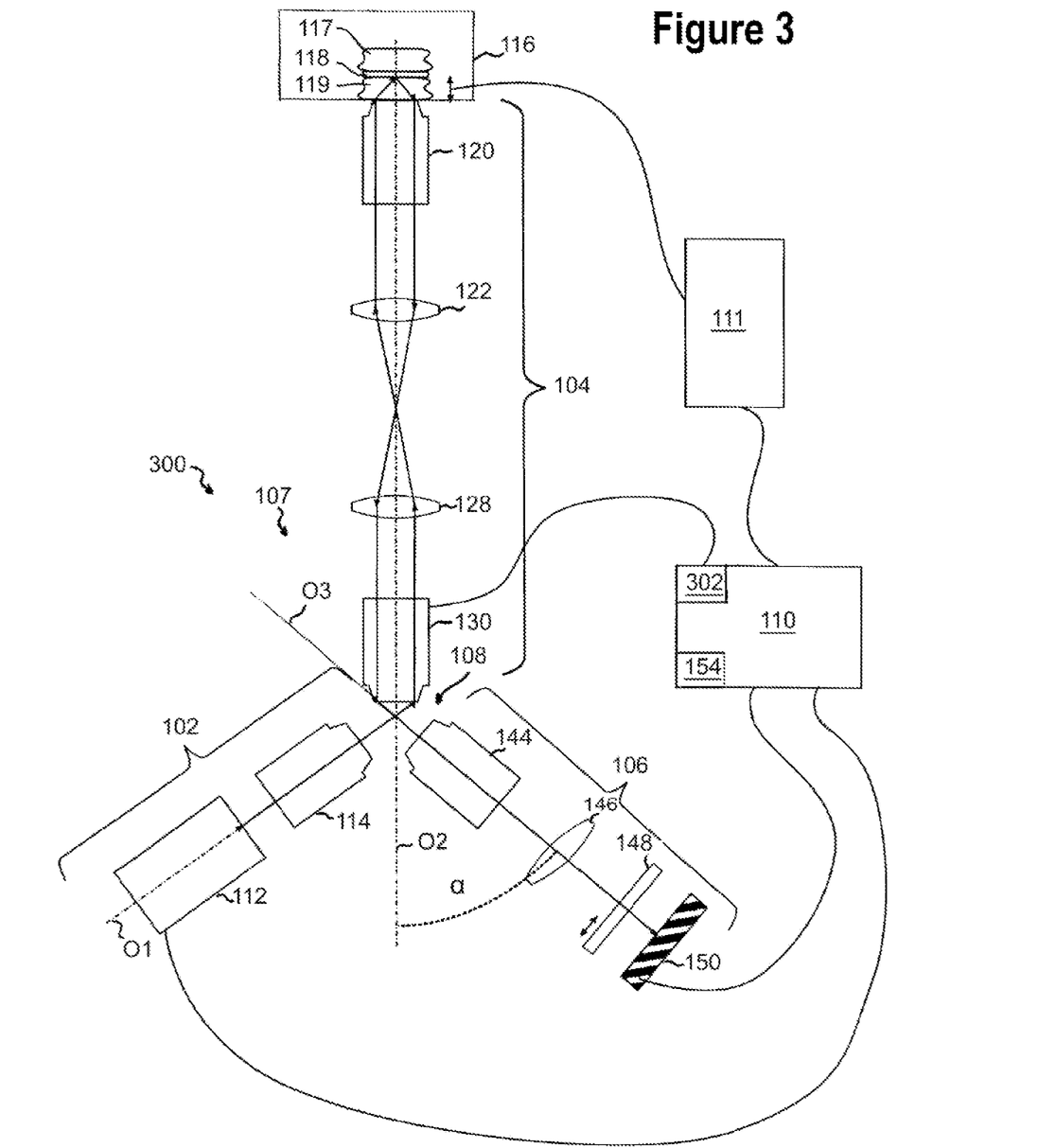
FIG. 3 shows a schematic illustration of the light sheet microscope, which provides scanning along the optical axis of the objective, according to one embodiment.

In the embodiment shown in FIG. 3, the transport optical unit 104 comprises, seen from the intermediate image space 108, the projection objective 130, the two tube lenses 122, 128, and the objective 120 facing toward the cover slip 118. The projection objective 130 has an electronic focusing apparatus 302, which is designed to focus the light sheet 134 on various planes in the sample chamber 116.

In the embodiment according to FIG. 3, the scanning device is formed by the electronic focusing apparatus 302. The light sheet and simultaneously the detection plane coplanar thereto are movable by the electronic focusing apparatus 302 along the optical axis O2 of the transport optical unit 104.

Figure 4:
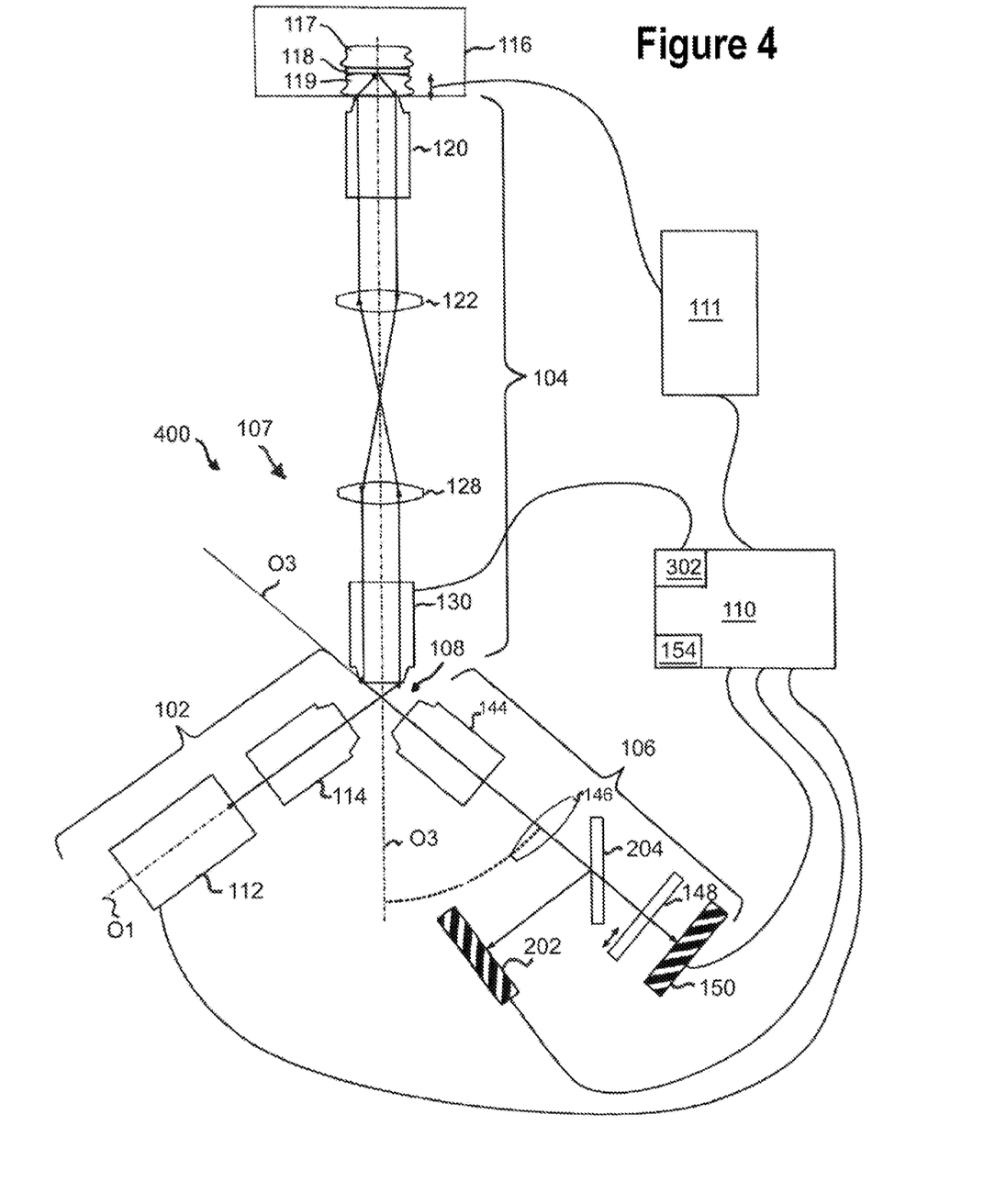
FIG. 4 shows a schematic illustration of the light sheet microscope, which provides scanning along the optical axis of the objective, according to an embodiment having two sensors.

FIG. 4 shows a schematic illustration of a light sheet microscope 400, which provides scanning along the optical axis O2 of the objective 120, according to an embodiment having two sensors 150, 202. The embodiment of the light sheet microscope 400 according to FIG. 4 differs from the embodiment of the light sheet microscope 300 according to FIG. 3 essentially due to the further sensor 202 and the beam splitter unit 204. Identical and identically acting elements are provided with the same reference signs in FIGS. 1 to 4.

FIG. 5 is a schematic illustration which shows the sample chamber 116 of the light sheet microscope 100, 200, 300, 400. FIG. 5 shows how the reflection light beam 142 is generated by reflection of the light sheet 134 on initially one of the surfaces 138, 140 of the cover slip 118.

According to FIG. 5, the light sheet 134, which lights the entry pupil 136 of the objective 120 from underneath in a decentralized manner, is guided by the objective 120 at an angle β oblique to the optical axis O2 onto that front face of the cover slip 118 which faces toward the objective 120 and is identified by 138 in FIG. 5. Since the cover slip 118 and an immersion medium 119 bordering its front face 138 have different indices of refraction, the front face 138 of the cover slip 118 and the immersion medium 119 adjoining thereon form an interface, on which the incident light sheet 134 is partially reflected. That part of the measurement light beam 134 reflected on this interface generates the reflection light beam 142, which is guided back into the objective 120.

Figure 6:
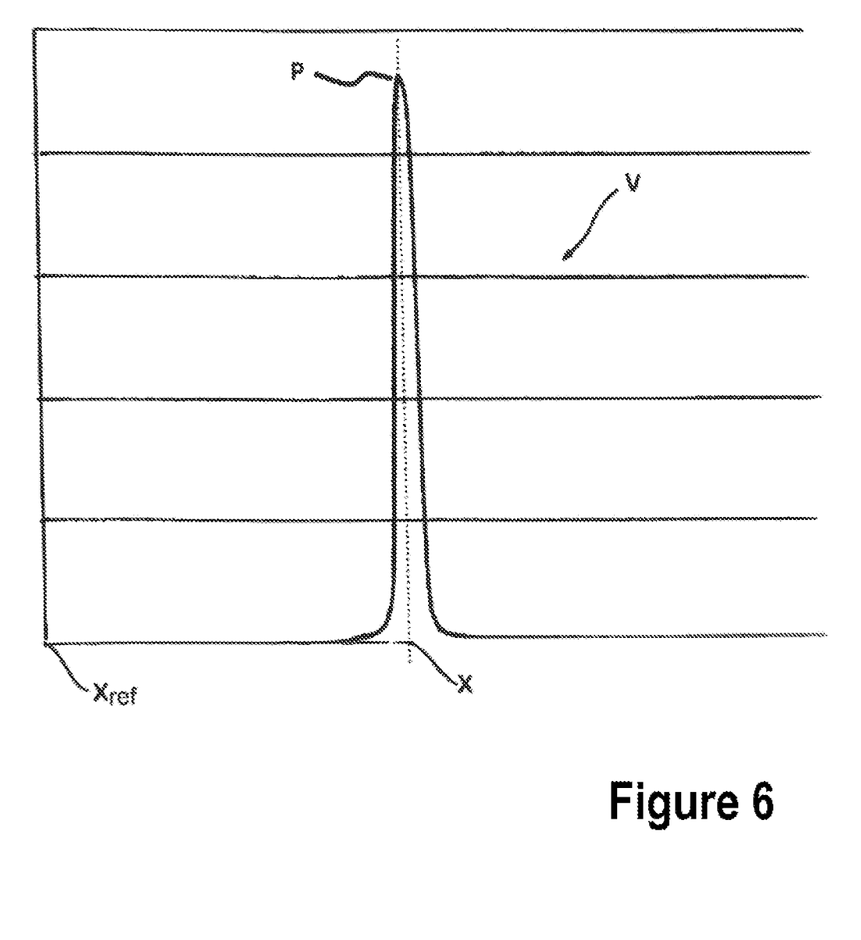
FIG. 6 shows an intensity distribution, acquired by a position-sensitive detector of the light sheet microscope, having an intensity maximum.

FIG. 6 shows an intensity distribution V, which the reflection light beam 54 generates on the position-sensitive detector 150. The abscissa of the diagram according to FIG. 6 reflects the incidence location on the detector 150 and the ordinate reflects the intensity measured at the respective incidence location. The intensity distribution V according to FIG. 6 shows a peak P, the location X of which, which is determinable on the position-sensitive detector 150 with respect to a reference location Xref, is a measure of the distance z to be determined as a measured variable, which the surface 138, 140 of the cover slip 118 has from the objective 120 along the optical axis O2. Furthermore, the surface under P is a measure of the intensity of the light reflected on the surface 138, 140.

FIG. 7 is a schematic illustration which shows the sample chamber 116 of the light sheet microscope 100, 200, 300, 400. FIG. 7 now shows how the reflection light beam 142 is generated by reflection of the light sheet 134 on both surfaces 138, 140 of the cover slip 118.

Accordingly, the light sheet 134, which illuminates the entry pupil 136 of the objective 120 from below in a decentralized manner, is guided by the objective 120 at the angle β oblique to the optical axis O2 onto that surface 138 of the cover slip 118 facing toward the objective 120. A first part of the light sheet, which is denoted by 134a in FIG. 7, is partially reflected on the first interface formed by the front face 138 of the cover slip 118 and the immersion medium 119 adjoining thereon. That part of the measurement light beam reflected on this first interface generates a first reflection light beam 142a, which is guided back into the objective 120.

The other part 152 of the light sheet 134, which the first interface transmits, is diffracted away from the optical axis O2 of the objective 120 upon entering the cover slip 118 and encloses an angle γ with this axis, which is greater than the angle β. This transmitted part 152 of the light sheet 134 is partially reflected on a second interface, which is defined by the rear face 140 of the cover slip 118 and an embedding medium 117 adjoining thereon, which has a different index of refraction than the cover slip 118. The second reflection light beam 142b, which passes through the front face 138 of the cover slip 118 and then arrives back in the objective 120, is generated by this second partial reflection of the light sheet 134 on the second interface.

As illustrated in the illustration according to FIG. 7, the oblique incidence of the light sheet 134 in the sample chamber 116 ensures that the reflection light beams 142a, 142b generated by the two partial reflections on the front face 138 or the rear face 140, respectively, of the cover slip 118 arrive back in the objective 120 on different optical paths. In this way, the two reflection light beams 142a, 142b are incident at different incidence locations on the position-sensitive detector 150, if it is ensured that both reflection light beams 142a, 142b are incident simultaneously on the detector 150. In other words, the two images of the cross section of the light sheet 134 generated on the front face 138 or the rear face 140 of the cover slip 118 are imaged spatially separated from one another on the position-sensitive detector 150, as is illustrated in the following diagram according to FIG. 8.

Figure 8:
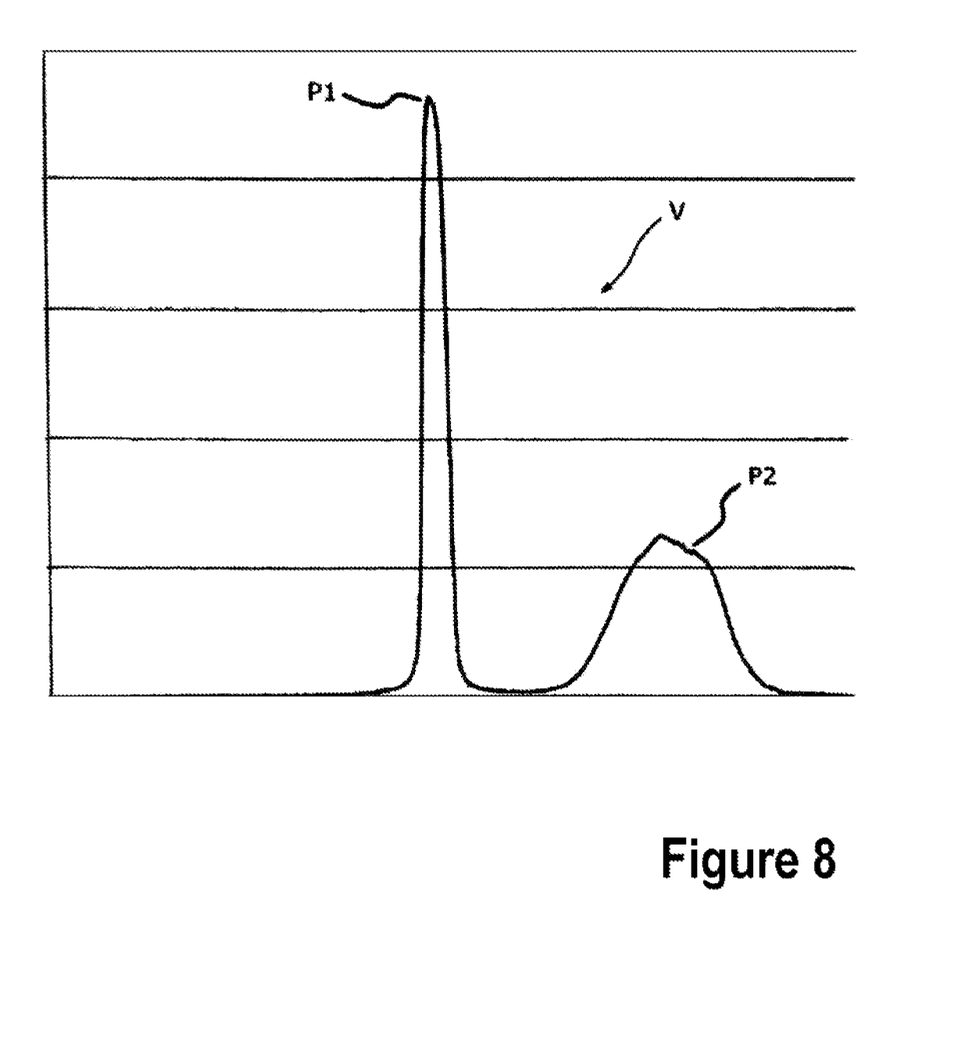
FIG. 8 shows an intensity distribution, acquired by the position-sensitive detector of the light sheet microscope, having two intensity maxima.

FIG. 8 shows an exemplary intensity distribution V, which the two reflection light beams 142a, 142b jointly generate on the position-sensitive detector 150. The abscissa of the diagram reflects the incidence location on the detector 150 and the ordinate reflects the intensity measured at the respective incidence location. The intensity distribution V according to FIG. 8 shows two peaks, of which the peak denoted by P1 is assigned to the first reflection light beam 142a and the peak denoted by P2 is assigned to the second reflection light beam 142b. It may be seen from the circumstance that the peak P1 is taller and sharper than the peak P2 that in the example according to FIG. 7, the light sheet 134 is focused on the front face 138 of the cover slip 118. In contrast, the second partial reflection on the rear face 140 of the cover slip 188 takes place at a point offset thereto transversely to the optical axis O2. The areas below the peaks P1, P2 shown in FIG. 8 are each a measure of the intensity of the respective reflection light beam 142a, 142b. For example, the index of refraction of one of the two optical media 117, 119 may be determined as a measured variable from their ratio.

A situation is shown in the example according to FIG. 8, in which the two reflection light beams 142a, 142b are incident simultaneously on the position-sensitive detector 150. This means that the spatial splitting of the two reflection light beams 142a, 142b, which corresponds to the thickness of the cover slip 118, is comparatively minor. In other words, in the example according to FIG. 8, the thickness of the cover slip 118 to be acquired as a measured variable is relatively small in relation to the object enlargement. However, a situation is also conceivable in which the spatial splitting of the reflection light beams 142a, 142b corresponding to the thickness of the cover slip 118 to be acquired is sufficiently large that a simultaneous acquisition of the two reflection light beams 142a, 142b by the position-sensitive detector 150 is not possible.

Although some aspects were described in the context of a device, it is clear that these aspects also represent a description of the corresponding method, wherein a block or a device corresponds to a method step or a function of a method step. Similarly thereto, aspects which are described in the context of a method step also represent a description of a corresponding block or element or a property of a corresponding device. Some or all method steps can be executed by (or with the use of) a hardware device, which can be, for example, a processor, a microprocessor, a programmable computer, or an electronic circuit. In some exemplary embodiments, one or more of the most important method steps can be executed by such a device.

Depending on specific implementation requirements, exemplary embodiments of the invention can be implemented in hardware or software. The implementation can be carried out using a nonvolatile storage medium such as a digital storage medium, for example, a diskette, a DVD, a Blu-ray, a CD, a ROM, a PROM and EPROM, an EEPROM or a flash memory, on which electronically readable control signals are stored which interact (or can interact) with a programmable computer system so that the respective method is carried out. The digital storage medium can therefore be computer-readable.

Some exemplary embodiments according to the invention comprise a data carrier having electronically readable control signals which can interact with a programmable computer system so that one of the methods described herein is carried out.

In general, exemplary embodiments of the present invention can be implemented as a computer program product having a program code, wherein the program code acts to execute one of the methods when the computer program product runs on a computer. The program code can be stored, for example, on a machine-readable carrier.

Further exemplary embodiments comprise the computer program for carrying out one of the methods described herein, which is stored on a machine-readable carrier.

In other words, one exemplary embodiment of the present invention is therefore a computer program having a program code for carrying out one of the methods described herein when the computer program runs on a computer.

A further exemplary embodiment of the present invention is therefore a storage medium (or a data carrier or a computer-readable medium), which comprises a computer program stored thereon for executing one of the methods described herein when it is executed by a processor. The data carrier, the digital storage medium, or the recorded medium are generally tangible and/or not seamless. A further exemplary embodiment of the present invention is a device as described herein which comprises a processor and the storage medium.

A further exemplary embodiment of the invention is therefore a data stream or a signal sequence which represents the computer program for carrying out one of the methods described herein. The data stream or the signal sequence can be configured, for example, so that they are transferred via a data communication connection, for example via the Internet.

A further exemplary embodiment comprises a processing means, for example, a computer or a programmable logic device, which is configured or adapted to execute one of the methods described herein.

A further exemplary embodiment comprises a computer on which the computer program for executing one of the methods described herein is installed.

A further exemplary embodiment according to the invention comprises a device or a system which is configured to transfer (for example electronically or optically) a computer program for executing one of the methods described herein to a receiver. The receiver can be, for example, a computer, a mobile device, a storage device, or the like. The device or the system can comprise, for example, a file server for transferring the computer program to the receiver.

In some exemplary embodiments, a programmable logic device (for example a field-programmable gate array, FPGA) can be used to execute some or all functionalities of the methods described herein. In some exemplary embodiments, a field-programmable gate array can cooperate with a microprocessor to carry out one of the methods described herein. In general, the methods are preferably carried out by any hardware device.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 light sheet microscope
102 illumination apparatus
104 transport optical unit
106 detection apparatus
107 optical system
108 intermediate image space
110 Processor
111 z drive
112 light source
114 illumination objective
116 sample chamber
117 embedding medium
118 cover slip or slide
119 immersion medium
120 Objective
122 tube lens
124, 126 Ocular
128 tube lens
130 projection objective
132 scanning mirror
134 light sheet 136 entry pupil
138 front face
140 rear face
142, 142a, 142b reflection light beam
144 detection objective
146 tube lens
148 Filter
150 Sensor
152 part of a light sheet
154 Memory
200 light sheet microscope
202 Sensor
204 beam splitter unit
300, 400 light sheet microscope
A light propagation direction
B extension direction
C scanning direction
O1, O2, O3 optical axes
α, β, γ Angles

The invention claimed is:

1. A light sheet microscope, comprising:
   a sample chamber in which a cover slip or slide is arrangeable, which has a surface that defines a partially reflective interface and which has a further surface that defines a further partially reflective interface,
   wherein the two interfaces are arranged at different distances from an objective,
   an optical system having the objective facing toward the cover slip or slide,
   an illumination apparatus, which is configured to generate a light sheet,
   a sensor, and
   a processor, wherein
   the two interfaces are formed in that two optical media are applicable in the sample chamber, which border the two surfaces of the cover slip or slide,
   wherein the light sheet microscope acquires a plurality of measured variables and is configured to guide the light sheet by way of the optical system with oblique incidence on the cover slip or slide, to generate a reflection light beam in that the light sheet is partially reflected at the partially reflective interface, to generate a further reflection light beam in that the light sheet is partially reflected at the further partially reflective interface and to receive the two reflection light beams by way of the optical system and to guide them onto the sensor,
   the sensor is configured to acquire intensities or incidence locations of the two reflection light beams,
   the processor is configured to determine a first measured variable, of the plurality of measured variables, on the basis of the acquired intensities or the incidence locations of the two reflection light beams, and
   the processor is configured to determine, on the basis of the acquired intensities of the two reflection light beams, a second measured variable, of the plurality of measured variables, wherein the second measured variable is the index of refraction of one of the two optical media.

2. The light sheet microscope according to claim 1, wherein the processor is configured to determine the first measured variable on the basis of the acquired incidence location of one of the two reflection light beams, wherein the first measured variable is the distance of the cover slip or slide from the objective along its optical axis.

3. The light sheet microscope according to claim 1, wherein the two surfaces of the cover slip or slide are formed plane-parallel to one another.

4. The light sheet microscope according to claim 1, wherein the processor is configured to determine the first measured variable on the basis of the acquired incidence locations of the two reflection light beams, wherein the first measured variable is the thickness of the cover slip or slide.

5. The light sheet microscope according to claim 1, wherein the one optical medium is an embedding medium for a sample which borders one of the two surfaces of the cover slip or slide.

6. The light sheet microscope according to claim 1, wherein the other optical medium is an immersion medium, which borders the other surface of the cover slip or slide and the objective.

7. The light sheet microscope according to claim 1, wherein the light sheet microscope is configured to generate a measurement pattern by way of the light sheet on the interface,
   to image the measurement pattern by way of the reflection light beam on the sensor,
   the sensor is configured to acquire the measurement pattern in the form of a spatial intensity distribution (V), and
   the processor is configured to determine the intensity of the reflection light beam from the spatial intensity distribution (V).

8. The light sheet microscope according to claim 1, wherein the sensor is a planar detector or a line detector.

9. The light sheet microscope according to claim 1, further comprising a detection apparatus having a further sensor for acquiring detection light which originates from the sample, and a beam splitter unit, which is configured to guide the reflection light beam onto the sensor and the detection light onto the further sensor.

10. The light sheet microscope according to claim 1, wherein the processor comprises a memory, in which parameters for determining the plurality of measured variable are storable.

11. The light sheet microscope according to claim 1, further comprising a filter which is switchable upstream of the sensor and which is opaque to the reflection light beam.

12. The light sheet microscope according to claim 1, further comprising a scanning element, which is configured to move the light sheet along a scanning axis.

13. The light sheet microscope according to claim 1, wherein the light sheet microscope is configured to guide the light sheet by way of the objective with oblique incidence on the cover slip or slide or to receive the reflection light beam by way of the objective and to guide it onto the sensor.

14. The light sheet microscope according to claim 1, further comprising a transport optical unit, which is configured to image the light sheet generated by the illumination apparatus in an intermediate image space in the sample.

15. A method for acquiring a plurality of measured variables by a light sheet microscope, in which
   a cover slip or slide, which has one surface that defines a partially reflective interface, and which has a further surface that defines a further partially reflective interface, is arranged in a sample chamber of the light sheet microscope, wherein the two interfaces are arranged at different distances from an objective, the method comprising:
   guiding a light sheet with oblique incidence onto the cover slip or slide;
   generating a reflection light beam in that the light sheet is partially reflected at the partially reflective interface;
   generating a further reflection light beam in that the light sheet is partially reflected at the further partially reflective interface, wherein the two interfaces are formed in that two optical media are introduced into the sample chamber, which border the two surfaces of the cover slip or slide;

receiving and deflecting the two reflection light beams onto a sensor;

acquiring intensities or incidence locations of the two reflection light beams;

determining a first measured variable, of the plurality of measured variables, on the basis of the acquired intensities or the incidence locations of the reflection light beams; and determining a second measured variable, of the plurality of measured variables on the basis of the acquired intensities of the two reflection light beams, wherein the second measured variable is the index of refraction of one of the two optical media.

* * * * *